May 19, 1964  B. LUSKIN  3,133,439
PRECISIONAL NAVIGATIONAL ORIENTATION
Filed Feb. 26, 1960  4 Sheets-Sheet 1

Fig. 1.

INVENTOR
BERNARD LUSKIN
BY John J. Rogan
ATTORNEY

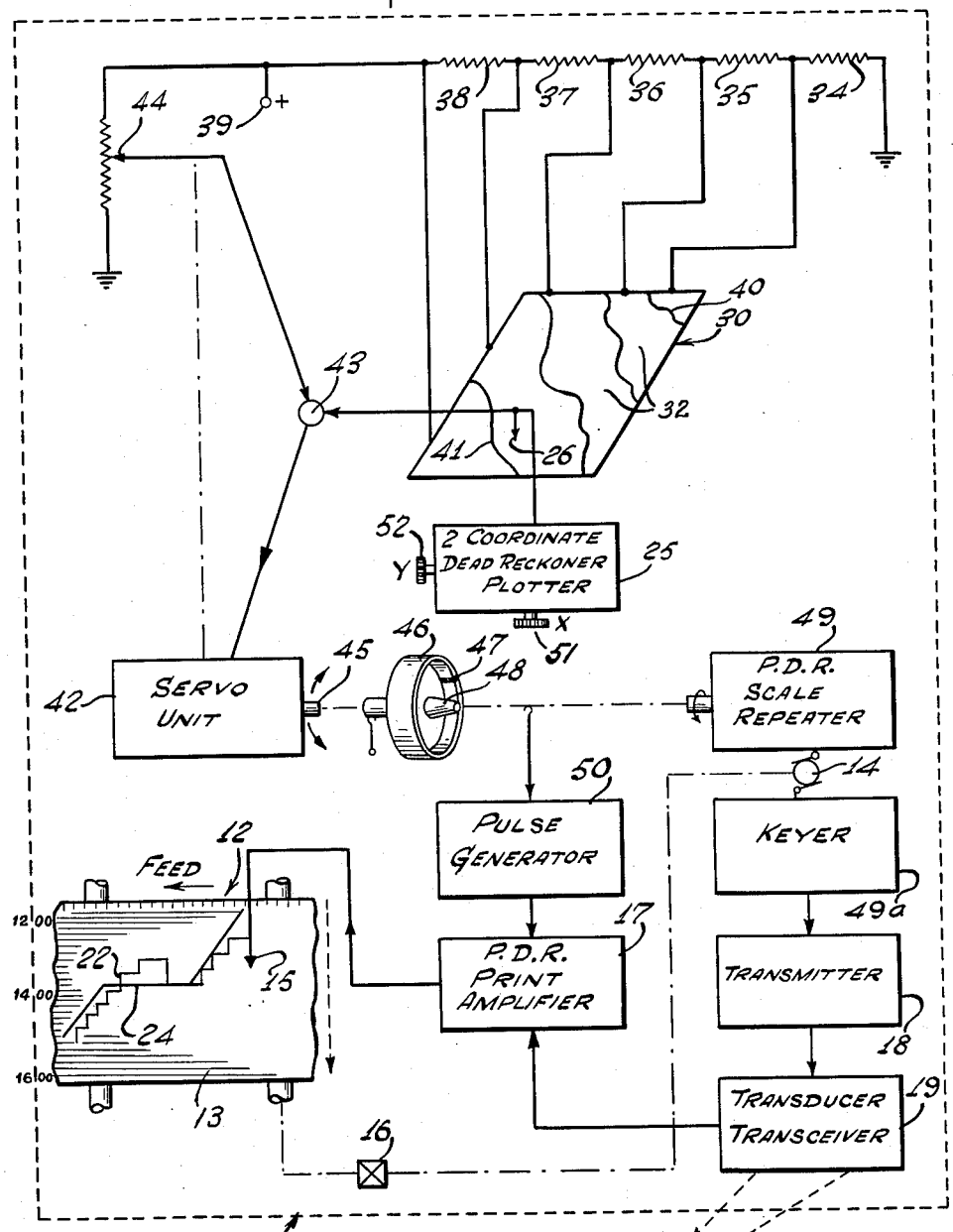

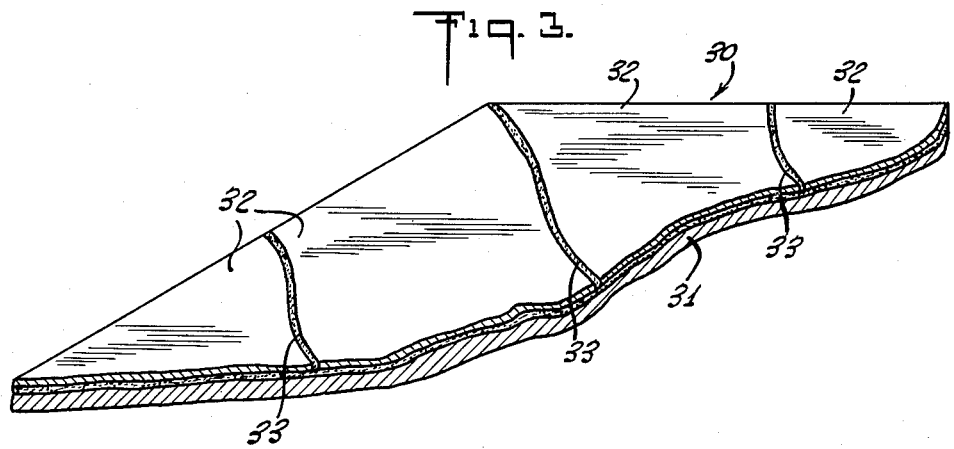
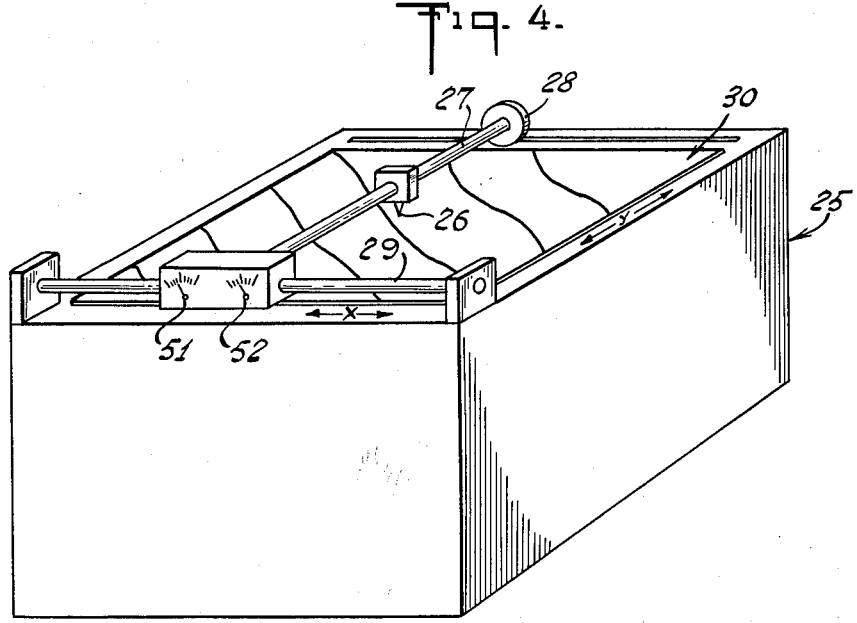

May 19, 1964 B. LUSKIN 3,133,439
PRECISIONAL NAVIGATIONAL ORIENTATION
Filed Feb. 26, 1960 4 Sheets-Sheet 4

INVENTOR
BERNARD LUSKIN
BY John J. Rogan
ATTORNEY

United States Patent Office 3,133,439
Patented May 19, 1964

3,133,439
PRECISIONAL NAVIGATIONAL ORIENTATION
Bernard Luskin, Teaneck, N.J., assignor, by mesne assignments, to Litton Systems, Inc., a corporation of Maryland
Filed Feb. 26, 1960, Ser. No. 11,240
14 Claims. (Cl. 73—178)

This invention relates to navigational systems and more particularly it relates to systems, methods and apparatus for precision navigation using wave reflection techniques.

A principal object of the invention is to provide a novel method and apparatus for obtaining a precise navigational position fix.

Another object is to provide a novel method of obtaining a precise navigational fix by combining a wave reflection indication with a dead reckoning indication.

Another object is to provide a novel and improved method of precision navigational control, especially suitable for submarine use or in any other situation where celestial observations and radiometric systems are not feasible.

A feature of the invention relates to a system for obtaining a precise positional point fix by producing a composited record constituted in part of sub-surface depth soundings taken at predetermined charted points along an actual track of the craft, and also in part of a known depth along a dead reckoning track, the two records being correlated and composited so that the fix of a submarine, vessel or other similar craft can be determined with great precision.

Another feature of the invention relates to a novel method of correcting a dead reckoning track record in accordance with signals obtained from a precision depth sounding record track corresponding to the location of the vessel or craft with respect to precharted bottom contours, so as to produce a precision positional fix for the craft.

Another feature relates to a novel form of contour chart for submarine topographic contours.

Another feature relates to a novel instrument employing a special form of surface contour chart and a dead reckoning plotter mechanism, whereby variations between dead reckoning tracks and actual vessel tracks can be expeditiously determined and indicated.

A further feature relates to the novel organization, arrangement and relative location and interconnection of parts which cooperate to provide an improved method and apparatus for obtaining a precision positional fix for a moving craft.

Other features and advantages not specifically enumerated will be apparent after a consideration of the following detailed descriptions and the appended claims and drawings.

While the invention finds its primary utility in enabling a submarine craft to obtain a precise positional fix, it will be understood that in explaining the invention in connection with submarine navigation, it is done merely for illustrative and explanatory purposes. Accordingly, in the drawing:

FIG. 1 is a section of a typical seamount structure chart showing, by contour lines, the location of precharted submarine topographic points of equal elevation or depth, and showing how to determine an actual ship track derived from the corresponding dead reckoning track in connection with a plurality of precision depth soundings, according to the invention;

FIG. 2 shows, partly in perspective view and partly in block diagram form, a system embodying features of the invention;

FIG. 3 is a broken-away perspective view of part of the novel contour chart according to one feature of the invention and as embodied in FIG. 2;

Figure 5:
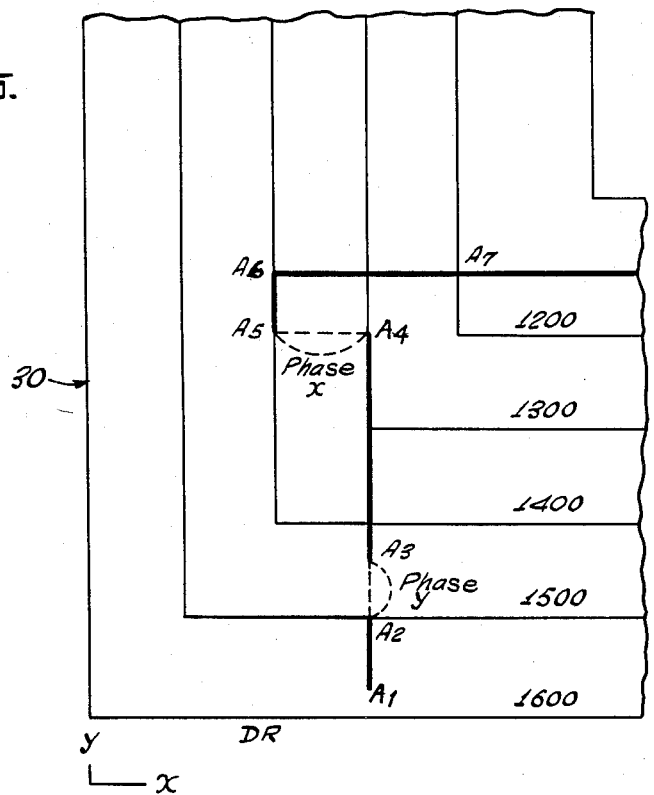
Figure 6:
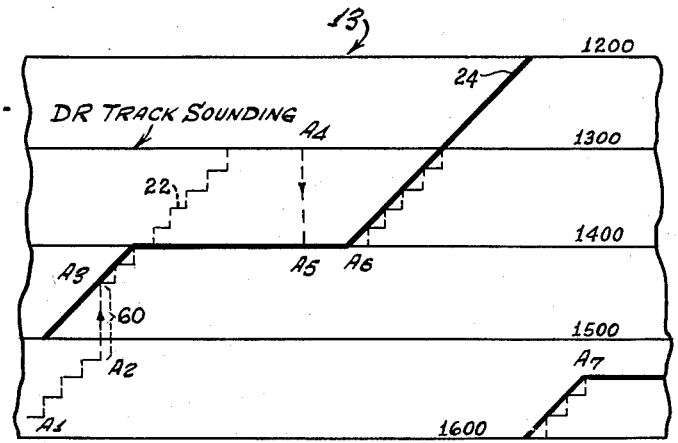

FIG. 4 is a perspective view of an instrument embodying the chart of FIG. 3 which generates the data signals for indicating and determining the departure of a dead reckoning track from the actual precision depth sounding track; and FIG. 5 is a magnified portion of an idealized contour chart used in explaining the invention; and FIG. 6 is an idealized illustration of a precision depth record showing the DR and sounding data plotted simultaneously.

As a result of the development heretofore of the so-called precision depth recorder, there are now available precision contour or depth profile charts of certain submarine areas in all of the oceans of the world. By the use of suitable charts, precision depth sounding records may be used, according to the invention, in almost any oceanic area of the world to obtain a line of positional fix with great precision. To obtain such a precision fix it has been proposed heretofore to use topographic lines of position in combination with simultaneously determined celestial or radiometric lines of position. However, such celestial or radiometric fixes are not available to a submarine craft without surfacing of the craft. While dead reckoning navigational methods using inertial techniques are presently being developed with high orders of accuracy and stability, nevertheless, like all dead reckoning methods, they are subject to cumulative error or drift and must be corrected periodically by an absolute method of position determination. Since celestial or radiometric observations are not available to submarines, while submerged, to obtain any absolute position indication, the present invention overcomes that difficulty and enables a highly accurate dead reckoning indication to be used in conjunction with a precision depth measurement to obtain a positional fix, without celestial or radiometric navigational computations.

The invention also provides a system which comprises a precision depth sounder and recorder and an automatic dead reckoning plotter equipment using precharted depth profiles which, in accordance with the invention, is modified to provide a digitalized electrical output corresponding to the precharted ocean depth and which is traced by the tracking element of the dead reckoning plotter as the latter traces the dead reckoning track. In accordance with one feature of the invention, there is provided a specially constructed digitalizing depth contour chart, and in conjunction with a servo repeater, the digitalized output of the dead reckoning plotter positions a shaft or other movable element in proportion to the depth as plotted by the dead reckoning plotter. This movable shaft or element is also used to produce an actual depth profile on the same recording chart obtained from measurements from a precision depth sounding apparatus. Thus, two separate depth records are produced on the same chart; one corresponding to the actual depths beneath the track of the vessel as determined by the precision depth soundings, and the other corresponding to the precharted depths along a dead reckoning track which may be subject to drift. By manual adjustment of the dead reckoning plotter during the recording, both depth records can be brought into substantial coincidence, and, when so done, the dead reckoning apparatus is corrected, and the drift or departure of the dead reckoning from the actual track of the vessel can be read off on the dials of the controls which are used to manually adjust the dead reckoning plotter.

In FIG. 1 of the drawing there is shown a section of a typical seamount or contour chart in which the X and Y scales form a grid system representing any convenient set of coordinates such as miles East, miles North, and so on. Each of the contour lines C on the chart represent constant depths in the topography of the ocean bottom obtained by any suitable survey. The line 10 represents the craft's actual track with respect to the ocean bottom, but which track is unknown and is to be determined according to the invention. The line 11 represents the track obtained from any well known dead reckoning equipment and plotted on the contour chart. The displacement of the two tracks results from the unavoidable cumulative drift in the dead reckoning system. The dead reckoning drift, however, may be considered negligible during the short time interval during which the craft traverses its actual track between points Q1 and Q2 for example, so that for such short periods of time the dead reckoning track may be considered as parallel to the actual track of the craft. Thus, the trace of the dead reckoning track 11 will extend from point P1 to point P2 during the short time interval that the craft is actually moving on a parallel traverse of the same length from point Q1 to point Q2. Since P1—P2 and Q1—Q2 are coincident in time and the tracks are parallel, P1Q1Q2P2 is a parallelogram. By moving the DR track P1—P2 parallel to itself until P1 and P2 rest on the contours corresponding respectively to the depths actually measured at the times of P1 and P2, the ship's true track Q1—Q2 is found.

Precision depth recorders are now well known in the art. They are used for timing the travel of acoustic pulses transmitted by an echo-sounding equipment and as reflected from the ocean bottom contour. A typical such recording equipment is disclosed in a paper entitled "Precision Measurement of Ocean Depth," by B. Luskin, B. C. Heezen, M. Ewing and M. Landisman, published in "Deep Sea Research," 1954, volume I, published by Pergamon Press Ltd., London. The recorder is indicated schematically in FIG. 2 of the present drawing by the numeral 12. It comprises, in general, a recording chart 13 which may be moved from right to left in the direction of the arrow, as seen in FIG. 2, by means of a suitable motor 14 and gearing 16 at a precisely calibrated feeding rate related to the speed of the craft being navigated. The chart 13 may carry a series of spaced parallel lines, representing respectively depths in fathoms. The recording stylus 15 is recurrently moved across the chart at a fixed rate, as indicated by the dotted arrow. The stylus 15 is energized by the output of a so-called print amplifier 17. However, the stylus does not mark the chart until it receives the amplified echo pulse as reflected from the ocean bottom. The stylus 15 traverses the width of the chart at a relatively high rate of speed so that its instantaneous position with respect to the chart's width represents the time it takes for the reflected pulses to arrive back from the ocean bottom.

Any well known echo sounding transmission and responding arrangement may be used. Such an arrangement is illustrated schematically in FIG. 2 and includes an acoustic pulse transmitter 18 which, by means of any well known transducer-transceiver 19 transmits the acoustic pulse to the ocean floor 20, and the reflected pulse is picked up by the transducer-transceiver 19 and is applied to the print amplifier 17 and thence to the recording stylus 15. Thus, there is traced on the chart 13 a record, for example record 22 of the precision soundings.

However, the chart 13 is merely calibrated in units of depth and is not capable by itself of giving an indication of the position of the craft 23 carrying the equipment illustrated within the dotted rectangle of FIG. 2. In accordance with this invention, I have found it possible to use the above noted precision depth recording equipment in conjunction with modified dead reckoning equipment to obtain such a precision positional fix for the craft 23. As explained in the paper "Geophysical Techniques for Precision Navigation at Sea," by B. Luskin and M. J. Davidson, Lamont Geological Observatory Technical Report No. 14, CU-40-NObsr-64547, Geol. February 1957, it is possible to record on the chart 13, substantially simultaneously with the depth record 22, other information such as latitude, longitude, etc. In accordance with this invention, there is recorded on the chart 13, substantially simultaneously with the precision depth record 22, a companion record 24 produced by the modified dead reckoning equipment 25 (FIGS. 2 and 4). For a detailed description of a typical automatic dead reckoning mechanism that may be used, reference may be had to U.S. Patent No. 1,785,241. In the illustrative embodiment of the invention shown herein, the dead reckoning mechanism of said patent is modified to provide for movement of the stylus or marker element in both coordinate directions over a stationary chart, instead of moving the marker element perpendicular to the direction of travel of the movable chart.

As indicated in the perspective view of FIG. 4, the dead reckoning instrument 25 comprises a tracing stylus or marker 26 which is provided with a mechanism for moving it in two different coordinates of motion. For example it may be moved along the shaft 27 under control of a suitable motor driven mechanism (not shown) so that the stylus 26 can be subjected to a motion in the Y direction at the same time the shaft 27 is moved in the X direction. The shaft 27 as shown, is provided with suitable roller mechanism 28 and supported on another shaft 29 at right angles to shaft 27. By suitable motor mechanism (not shown), the shaft 27 and the stylus 26 can be subjected to a coordinate movement in the X direction. In accordance with one feature of the invention, the instrument 25 is provided with a special contour chart 30, a typical form of which is shown in broken-away perspective section in FIG. 3. It may comprise a backing plate 31 of suitable insulation on which have been printed by any well known printed circuit techniques the various segments 32 corresponding to the areas between the lines 33 of a standard depth contour chart, a portion of which is shown in FIG. 1. Thus, the conductive segments 32 are separated by the fine contour lines 33 of insulation, these lines corresponding to the topographic lines C shown in the chart of FIG. 1. It will be understood, of course, that the invention is not limited to any particular manner of making this modified topographic contour chart, providing the surface areas defined by the contour lines 33 can be electrically differentiated from each other. Preferably, however, the chart is made with the contour lines of non-conductive material and the remaining surface area of segments of the chart between those lines of conductive material maintained at different electrical potentials, as will be explained.

The purpose of the chart 30 is to convert the movement of the dead reckoning stylus 26 into a digitalized output, with the digitalization corresponding to the varying depths as indicated on the chart 30. It will be understood, of course, that the stylus 27 is of metal or other conductive material so as to connect the conductive segments 32 in the digitalizing circuit to be described. Thus, as shown in FIG. 2, each of the conductive segments 32 is connected to a corresponding point in a chain of series connected resistors 34–38, there being one such resistor for each of the conductive chart segments. Preferably the first resistor 34 in the chain is connected to ground at one end and the chain of resistors is connected to a suitable direct current voltage source 39. While FIG. 2 of the drawing shows five segments and five corresponding resistors 34–38, it will be understood that this is merely illustrative. For example, the contour line 40 may represent the region of 0 depth and the line 41 may represent the region of 200 fathoms, as indicated on the chart 13. It will be understood, of course, that while separate series connected resistors are shown in FIG. 2, a single resistor may be used with a series of taps at equally spaced points along the resistor, assuming of course that the contour lines on the chart 30 represent equally spaced units of depth. In any event each tap is connected to a corresponding conductive segment on the chart 30. In other words, each segment of the chart 30 will have a potential corresponding to the depth which that particular segment represents on the chart, which of course will then represent the corresponding potential picked up by the tracer stylus 26 which, in turn, represents the charted ocean depth at the corresponding dead reckoning point.

As pointed out above, the potentials picked up by the stylus 26 may not represent the actual ocean depth beneath the submarine craft, depending upon whether the dead reckoning equipment 25 is deviating from the craft's actual track. In accordance with the invention, the tracer 26 of the dead reckoning equipment is connected to any well known servo repeater comprising for example the servo unit 42 which, in the well known manner, may be connected to a suitable balancing mechanism 43 for adjusting the potentiometer contact 44 such as is used in any well known servo balancing arrangement. In other words, in accordance with well known servo technique, the member 44 is moved until the potential picked up thereby is equalized by the potential picked up by the tracer 26. The servo unit 42 also has an output shaft 45 connected to a contact ring or sleeve 46 which is interrupted by a narrow insulator strip 47. Associated with sleeve 46 is a rotatable contact member 48 which is driven in synchronism with the stylus 15 under control of a suitable scale repeater 49 driven by the motor 14 which motor may also drive the keyer 49a of the echo sounding equipment. Contact 48 is connected to any well known pulse generator 50. This pulse generator will therefore be triggered to deliver a pulse to the print amplifier 17 of the depth recorder 12 at an instant of time which is determined by the rotary phase displacement of the insulator strip 47 with respect to the rotating brush 48. That is to say, there will be produced upon the chart 13 during each trace of the stylus 15 across the chart, a recorded point or pulse whose location, with respect to the calibration line on the chart, is a function of the phase displacement of ring 46 from its normal or zero position. Thus, if the tracer 26 of the dead reckoning plotter is resting on the zero depth segment of the digitalizing chart 30, at the instant the strip 47 engages brush 48, the recording stylus 15 of the depth recorder will be energized at the zero depth position of chart 13. However, if for example at the instant strip 47 engages brush 48, the dead reckoning tracer 26 is on the 200 fathom segment, then the stylus 15 will be at the 200 fathom line on chart 13. Thus the servo controlled contact sleeve 46 and the associated scale repeater contact 48 determine the point across the chart width at which the stylus 15 will be pulsed to represent the position of the dead reckoning tracer 26.

If the dead reckoning depth record 24 is in coincidence with the depth record 22 of the ship's actual track, that fact indicates that the dead reckoning plotter is correct and no adjustment is necessary. In other words, the precise position of the craft can be determined from a reading of the dead reckoning plotter. On the other hand, if the records 22 and 24 on the depth recorder are displaced with respect to each other, that is an indication that the dead reckoning equipment has drifted. Therefore, by manual adjustment of the dead reckoning tracer 26 in the X and Y directions by suitable controls 51 and 52, the two traces 22 and 24 on the depth recorder chart can be brought into coincidence, and the amount of such adjustment can be read off from the control dials 51 and 52, indicating the extent to which the dead reckoning equipment has drifted. By these adjustments and readings the actual position of the craft can be determined with precision.

For a clearer understanding of the method of arriving at a precise point fix by comparison of the ship's actual sounding trace with the dead reckoning sounding trace, reference may be had to the diagrams of FIGS. 5 and 6. These figures represent a portion of an idealized contour chart corresponding to the chart 30 and the recording chart 13 respectively. In this prerecorded depth contour chart 30 of FIG. 5, the contour lines are straight rather than curved as shown in FIG. 1 and have right angle portions in order to simplify the explanation. The solid line illustrated on the chart shows the path or track being followed over this prerecorded chart by the dead reckoning pointer. In FIG. 6 is shown an enlarged portion of the recording 13, as shown in FIG. 2, and having two traces 22 and 24 being recorded thereon. The dark solid line trace 24 illustrates the recording trace being made of the actual depth measurements taken along the track of the ship, and the lighter colored digitized trace 22 illustrates the depth contour along the track of the dead reckoning apparatus. Referring to FIG. 5 and following the path of the dead reckoning trace along the prerecorded chart 30, it is noted that from position $A_1$ to $A_2$, the depth changes from 1600 fathoms to 1500 fathoms, and referring to the corresponding recorded trace 22 in FIG. 6, it is noted that the digitized recorded trace likewise changes from less than 1600 fathoms to 1500 fathoms between these positions. However, at the corresponding position $A_2$, the actual measured depth under the craft and recorded at trace 24 at position $A_3$ shows a lower depth of between 1400 to 1500 fathoms, indicating an error between the actual measured depth and that determined by the dead reckoning apparatus. Thus as appears from FIG. 6, at the point A2 of the dead reckoning track, the dead reckoning indicated sounding is 60 fathoms too deep. Since the point A2 of the dead reckoning record 22 is 60 fathoms below the actual craft track, as indicated by the point A3 on trace 24 in FIG. 6, it is necessary, in order to bring the tracers into coincidence, to move the dead reckoning tracer 26 in the Y direction by 60 fathoms, as indicated by the line "Phase Y" in FIG. 5. Since the ship's actual track and the dead reckoning tracks are essentially parallel for the short time needed to calibrate, one may now visualize the situation as a real ship moving along the actual depth track of the ship's actual course and another ship moving abreast along parallel Y lines on the dead reckoning plotting board. Returning to FIGS. 5 and 6, at the 1400 fathom line, the depth profiles corresponding to the actual track of the ship 24 and the dead reckoning track 22 again diverge. When the dead reckoning track 22 reaches point A4 (FIG. 6) the depth noted on the dead reckoning track 22 is 1300 fathoms whereas the actual depth measured and indicated on track 24 (FIG. 6) is recorded at 1400 fathoms at the corresponding position $A_5$. Thus it is apparent that the ship's true track lies off to the left 100 fathoms down the slope. By using the X coordinate phasing control 51 on the dead reckoning plotter, the dead reckoning pointer 25 is moved left to the 1400 fathom line as shown in FIG. 5 as phase X, and the dead reckoning track 22 at positions A5, A6 then becomes coincident with the ship's actual track 24, as shown. In the event that a check on the calibration is desired, the ship's course might be changed for example at the point A6 (FIG. 5) so that it runs towards the point A7 (FIG. 5). A true fix will then be indicated by the coincidence of the indicated dead reckoning profile and the ship's actual depth sounding profile shown in FIG. 6 between the points A6 and A7. In a practical case, of course, the geometry of the contour lines is not the ideal straight lines as indicated in FIG. 5, so that several X and Y phasing adjustments may be required to attain the desired coincidence between the indicated dead reckoning profile and the ship's actual track depth profile. In any case the homing or coincidence technique above described can be used to advantage to provide a rough calibration quickly and easily, and the graphical technique described hereinabove in connection with FIG. 1 can be used to obtain a more exact position fix.

By the use of the invention, therefore, a single depth recorder can provide on its chart two sounding records, one of which corresponds to the depth profile of the ocean bottom beneath the actual track of the craft and the other an indicated depth profile corresponding to the dead reckoning track. The recording of dead reckoning coordinate data simultaneously with the soundings of the true track depth recordings, provides a convenient and precise means of correlating the two sounding data. Given a suitable topographic contour chart, the true track depth recorder sounding and the dead reckoning data may be used to provide a combined fix by a simple graphical construction. The single precision depth recorder therefore provides a direct simultaneous comparison of the true track depth soundings, and the indicated soundings for the dead reckoning, thus providing an effective means for systematically using sounds for precision navigation.

While certain specific apparatus has been disclosed herein, it will be understood that various changes and modifications may be made therein without departing from the spirit and scope of the invention.

What is claimed is:

1. The method of obtaining a precision fix for a navigable craft such as a submarine while submerged, which comprises, making echo soundings to produce a true depth record of the craft's track, producing digitalized depth signals representative of the depths along the track of the craft as traced on a dead reckoner which is subject to drift, applying said digitalized signals to produce another record, and adjusting the dead reckoner until said digitalized signals as recorded substantially coincide with the true depth record.

2. The method of obtaining a precision fix for a navigable craft such as a submarine while submerged, which comprises, making by echo sounding a precision echo-controlled trace of the depth of the water beneath the craft and along the actual track of the craft the location of which track is unknown, producing digitalized signals representing the depth of the water at a point corresponding to the two coordinates of the track of the craft as indicated by a dead reckoning plotter which is subject to drift, applying said digitalized signals to make a corresponding record trace whose displacement with respect to the first trace indicates the amount of drift in the said dead reckoner, and varying at least one of the coordinates of said digitalized signals until both said record traces are brought into substantial coincidence.

3. The method according to claim 2 in which both of said record traces are made on the same recording chart of a precision depth recorder in a relationship indicating the difference between the depths along the actual track and the dead reckoning track.

4. Apparatus for obtaining a precision fix for a navigable craft, which comprises, a chart having electrically conductive segments representing contours of the general area of the location of the craft, echo-controlled means to make a record trace of the actual distance of the craft from a reflecting surface of known location, means including a dead reckoning instrument having a dead reckoning tracer element and means to move said tracer element in both coordinate directions over said chart representing said contour and to produce digitalized signals corresponding to the indicated distance between the craft and the said reflecting surface at the point on said chart indicated by the said tracer, means to apply said digitalized signals to make a record trace of said indicated distance and substantially simultaneously with the first record, and means to adjust said tracer in coordinate directions to bring said tracer element into a position with respect to said chart representative of the actual track of the craft.

5. Apparatus according to claim 4 in which the means to make the first mentioned record trace includes a precision depth recorder having a recording chart, and means are provided to make both said record traces substantially simultaneously on said chart.

6. Apparatus according to claim 4 in which the chart of the dead reckoning instrument has its surface provided with contour lines representing the topographic elevations on said reflecting surface, said lines having different electric conductivity from the remainder of the chart's surface between said lines, and a source of electrical potential is connected to said chart.

7. Apparatus according to claim 4 in which said chart comprises a plate having its surface divided into zones separated by said contour lines, matching the topographical contour of said reflecting surface, said contour lines being of insulation and the remainder of the surface of said chart between the lines being conductive.

8. A precision navigational system for marine craft and the like, comprising, echo-sounding apparatus for producing first signals representing depth soundings between the craft and the marine floor, a dead reckoning plotter having a chart provided with contour lines matching topographical contour lines of said floor, said dead reckoning plotter also including a tracing stylus moved in coordinate directions over said chart, means including said tracing stylus to produce second signals determined by the position of said stylus with respect to the contour lines of said chart, and means to make substantially simultaneous recorded traces of both the first and second signals.

9. A precision navigational system comprising a precision depth recorder having means to trace a record of echo depth sounding signals produced along the actual track of a moving craft, a dead reckoning instrument having a chart with contour lines matching the topographical contour lines of the marine floor, a tracer element for said chart, means for moving said tracer element over said chart in accordance with dead reckoning computations of the craft's track, means responsive to the position of said tracer element on said chart to produce a signal representing the position of said tracer element on said chart and means to apply said last mentioned signal to said depth recorder to be recorded simultaneously with the first mentioned record.

10. A precision navigational system according to claim 9 in which said dead reckoning instrument comprises a pair of manually operable controls with dials for adjusting said tracer element in coordinate X and Y directions, the settings of said dials indicating the departure of the dead reckoning track from the actual track of the craft.

11. A precision navigational system according to claim 10 in which the segments of said chart between adjacent contour lines are of different conductivity from the said contour lines, and said system includes a source of potential and a voltage divider network for applying graded units of potential respectively to said segments whereby an output signal is produced whose potential represents the position of setting of said stylus on said chart, a servo repeater connected to said tracer element, and, a cyclically operating contactor arrangement having a pair of movable elements one of which is movable by said servo repeater and the other of which is moved in synchronism with the recording element of said depth recorder to vary the energization of said recording element in accordance with the position of said tracer element.

12. A precision navigational system according to claim 11 in which said other element of said contactor arrangement comprises a member mechanically driven by a scale repeater which is driven by the motor for driving said recorder, and said contactor arrangement is connected to a pulse generator for transmitting a recording pulse to the recorder.

13. Apparatus for precision navigational orientation of navigable craft comprising, means for measuring and obtaining signals corresponding to the actual distance between the craft and a terrestrial surface of known topographic contour along the course of the craft, means for recording said signals corresponding to the actual distances, a chart member of said terrestrial surface, dead reckoning navigation means including a dead reckoning tracer element cooperating with said chart member, means including said tracer for generating signals representing the apparent distances to said surface corresponding to the apparent craft positions, as indicated by said dead reckoning means, means for recording said signals representing the apparent distances and means for shifting the position of the tracer element to correlate the apparent distances and actual distances being measured to correct any error in the dead reckoning means.

14. The method of obtaining a precision fix for a navigable craft which comprises: obtaining a series of signals on the craft that are representative of the actual distance between the craft and the topographical contour of a surface with respect to which the craft passes, recording such actual distance signals, obtaining from a dead reckoning track and a precharted typographical contour chart of the said surface a series of predicted signals corresponding to distance measurements between the craft and said surface if the craft were following a path corresponding to the dead reckoning, recording said dead reckoning obtained signals, correlating said actual distance recorded signals and said dead reckoning obtained signals, and adjusting said dead reckoning track so that said predicted recorded signals coincide with said recorded actual distance signals.

References Cited in the file of this patent

UNITED STATES PATENTS

| | | |
|---|---|---|
| 1,785,241 | Bates | Dec. 16, 1930 |
| 2,354,391 | McCourt | July 25, 1944 |
| 2,541,277 | Omberg et al. | Feb. 13, 1951 |
| 2,588,386 | Hubbard | Mar. 11, 1952 |
| 2,623,116 | Rymes | Dec. 23, 1952 |
| 2,847,855 | Berger | Aug. 19, 1958 |

FOREIGN PATENTS

| | | |
|---|---|---|
| 871,920 | France | Jan. 29, 1942 |

UNITED STATES PATENT OFFICE
CERTIFICATE OF CORRECTION

Patent No. 3,133,439                    May 19, 1964

Bernard Luskin

It is hereby certified that error appears in the above numbered patent requiring correction and that the said Letters Patent should read as corrected below.

Column 7, line 19, for "sounds" read -- soundings --.

Signed and sealed this 23rd day of February 1965.

(SEAL)
Attest:

ERNEST W. SWIDER
Attesting Officer

EDWARD J. BRENNER
Commissioner of Patents